(12) United States Patent
Zhou et al.

(10) Patent No.: US 11,848,737 B2
(45) Date of Patent: Dec. 19, 2023

(54) TECHNIQUES FOR AUTONOMOUSLY DETERMINING CANDIDATE BEAMS TO SUPPORT FULL-DUPLEX COMMUNICATION

(71) Applicant: QUALCOMM Incorporated, San Diego, CA (US)

(72) Inventors: Yan Zhou, San Diego, CA (US); Jung Ho Ryu, Fort Lee, NJ (US); Qian Zhang, Basking Ridge, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/317,694

(22) Filed: May 11, 2021

(65) Prior Publication Data
US 2021/0376905 A1 Dec. 2, 2021

Related U.S. Application Data

(60) Provisional application No. 63/032,374, filed on May 29, 2020.

(51) Int. Cl.
| | | |
|---|---|---|
| H04L 5/14 | (2006.01) | |
| H04B 7/06 | (2006.01) | |
| H04W 24/10 | (2009.01) | |
| H04W 72/044 | (2023.01) | |
| H04W 72/21 | (2023.01) | |

(52) U.S. Cl.
CPC ............ *H04B 7/0695* (2013.01); *H04L 5/14* (2013.01); *H04W 24/10* (2013.01); *H04W 72/046* (2013.01); *H04W 72/21* (2023.01)

(58) Field of Classification Search
CPC .... H04B 7/0695; H04B 7/0814; H04B 7/088; H04L 5/14; H04W 24/10; H04W 72/0413; H04W 72/046; H04W 36/0088; H04W 72/042
See application file for complete search history.

(56) References Cited

U.S. PATENT DOCUMENTS

| | | | |
|---|---|---|---|
| 2018/0199328 A1* | 7/2018 | Sang | .................... H04B 7/0617 |
| 2019/0081688 A1 | 3/2019 | Deenoo et al. | |
| 2019/0116605 A1* | 4/2019 | Luo | .................... H04B 7/15542 |

(Continued)

FOREIGN PATENT DOCUMENTS

| | | | | |
|---|---|---|---|---|
| WO | WO-2018085144 A1 * | 5/2018 | ............ | H04W 24/08 |
| WO | 2019164363 A1 | 8/2019 | | |

(Continued)

*Primary Examiner* — Thai Nguyen
(74) *Attorney, Agent, or Firm* — Arent Fox LLP/Qualcomm Incorporated

(57) ABSTRACT

Aspects described herein relate to autonomously measuring one or more new candidate beam pairs during configured resources to determine measurement results for the one or more new candidate beam pairs, where the configured resources can be configured for uplink communications or measurement gaps for transmitting signals to measure candidate beams. A measurement result or an indication of at least one new candidate beam pair can be reported based on a measurement result for the at least one new candidate beam pair of the one or more new candidate beam pairs.

30 Claims, 6 Drawing Sheets

(56) References Cited

U.S. PATENT DOCUMENTS

| | | |
|---|---|---|
| 2019/0159155 A1 | 5/2019 | Abedini et al. |
| 2019/0191399 A1 | 6/2019 | Islam et al. |
| 2019/0215888 A1 | 7/2019 | Cirik et al. |
| 2019/0261344 A1 | 8/2019 | Grant et al. |
| 2021/0376904 A1 | 12/2021 | Zhou et al. |
| 2022/0210816 A1 | 6/2022 | Wu et al. |
| 2022/0264318 A1 | 8/2022 | Nilsson et al. |

FOREIGN PATENT DOCUMENTS

| | | |
|---|---|---|
| WO | 2020221432 A1 | 11/2020 |
| WO | 2021223865 A1 | 11/2021 |

* cited by examiner

TECHNIQUES FOR AUTONOMOUSLY DETERMINING CANDIDATE BEAMS TO SUPPORT FULL-DUPLEX COMMUNICATION

CLAIM OF PRIORITY UNDER 35 U.S.C. § 119

The present Application for Patent claims priority to Provisional Patent Application No. 63/032,374, entitled "TECHNIQUES FOR AUTONOMOUSLY DETERMINING CANDIDATE BEAMS TO SUPPORT FULL-DUPLEX COMMUNICATION" filed May 29, 2020, which is assigned to the assignee hereof and hereby expressly incorporated by reference herein for all purposes.

BACKGROUND

Aspects of the present disclosure relate generally to wireless communication systems, and more particularly, to using beams in full-duplex communication.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to communicate based on a current beam pair configured for full-duplex communication, autonomously measure one or more new candidate beam pairs during configured resources to determine measurement results for the one or more new candidate beam pairs, and report, based on a measurement result for at least one new candidate beam pair of the one or more new candidate beam pairs, the measurement result or an indication of the at least one new candidate beam pair.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to transmit a configuration indicating a measurement gap for measuring new candidate beam pairs for full-duplex communication, and receive a measurement result or an indication of at least one new candidate beam pair of one or more new candidate beams measured during the measurement gap.

In a further aspect, a method for wireless communication is provided that includes communicating based on a current beam pair configured for full-duplex communication, autonomously measuring one or more new candidate beam pairs during configured resources to determine measurement results for the one or more new candidate beam pairs, and reporting, based on a measurement result for at least one new candidate beam pair of the one or more new candidate beam pairs, the measurement result or an indication of the at least one new candidate beam pair.

In another aspect, a method for wireless communication is provided that includes transmitting a configuration indicating a measurement gap for measuring new candidate beam pairs for full-duplex communication, and receiving a measurement result or an indication of at least one new candidate beam pair of one or more new candidate beams measured during the measurement gap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
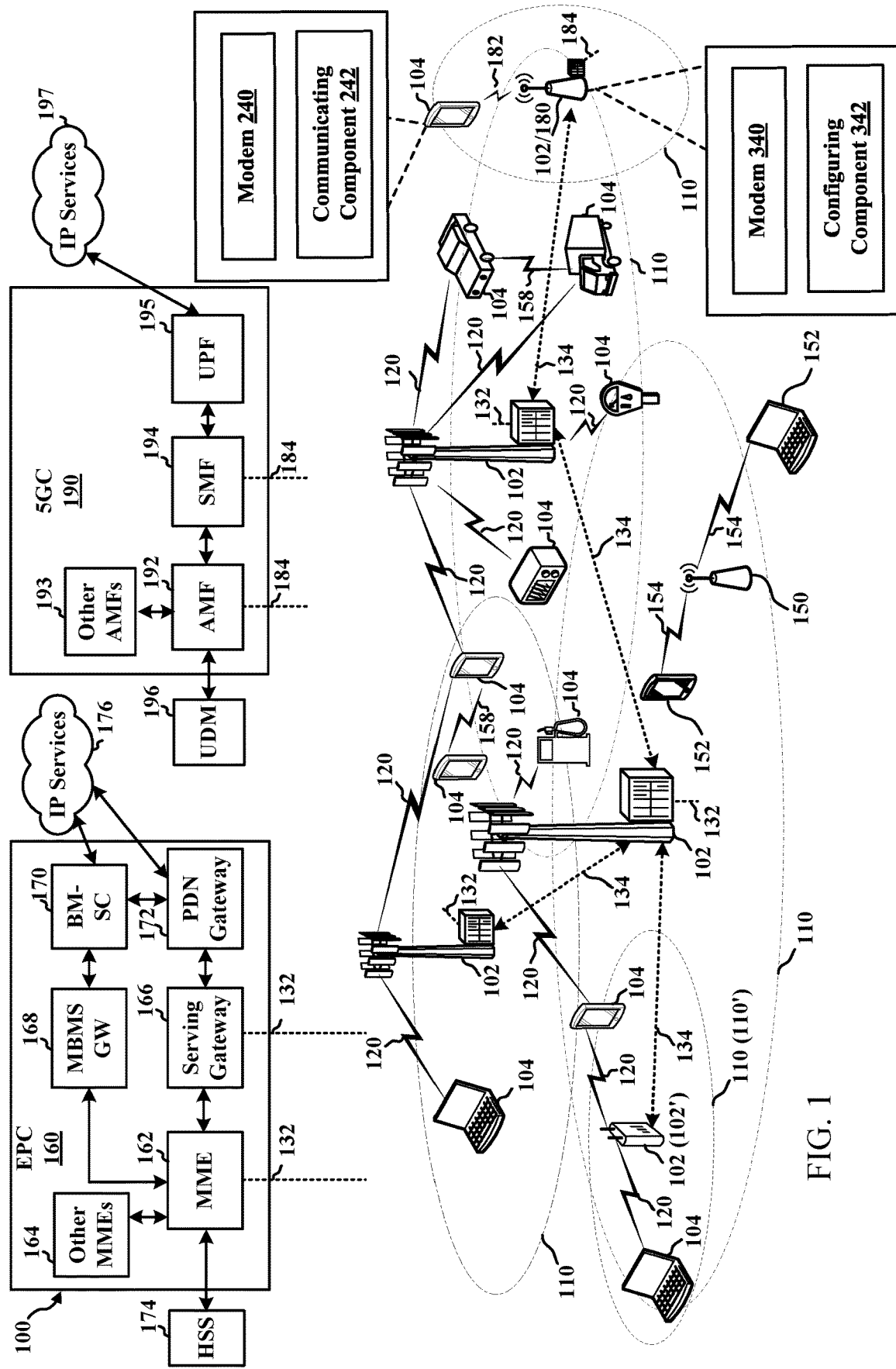
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to autonomously determining candidate beams to support full-duplex communication. For example, a device can be configured to communicate in a wireless network based on a transmit and receive beam pair, which can be used to enable full-duplex communication. As the device moves throughout the network, the current beam pair may not be as desirable as when first configured. For example, this may be caused by changes in orientation of the device with respect to another device or base station with which the device communicates, movement of obstructing or reflecting entities or movement of the device with respect to such obstructing or reflecting entities, etc. Accordingly, the device can autonomously measure new candidate beam pairs to be used in the full-duplex communication, and can report one or more new candidate beam pairs to facilitate configuration of the one or more new candidate beam pairs for the device and/or for a serving base station, etc.

Full-duplex (FD) communication, as referred to herein, can include concurrent transmitting and receiving by a device. For example, a user equipment (UE) in fifth generation (5G) new radio (NR) or other radio access technologies can communicate in full-duplex by concurrently transmitting uplink (UL) communications to a base station or transmission/reception point (TRP) and receiving downlink (DL) communications from the base station or TRP (or another base station or TRP). Similarly, a base station can communicate in FD by concurrently transmitting downlink communications to a UE and receiving uplink communications from the UE. FD communication can also be referred to as flexible time division duplexing (TDD). In addition, in 5G NR for example, flexible TDD can correspond to simultaneous uplink/downlink transmission in frequency range 2 (FR2). As described above, flexible TDD capability can be present at either the base station (e.g., gNB) or UE or both. For instance at UE, UL transmission can be from one panel and DL reception in another panel, and/or can be conditioned on beam separation at the panels. Flexible TDD can provide latency reduction where it can be possible to receive DL signal in UL only slots, which can enable latency savings. Flexible TDD can also provide spectrum efficiency enhancements (e.g., per cell, per UE), more efficient resource utilization, etc.

In one example, FD communications can include a first case where one UE operates in FD to communicate with a first TRP via DL and a second TRP via UL, where a base station may provide both TRPs, but each TRP may operate half-duplex. In another example, FD communications can include a second case where one base station can operate in FD to communicate with a first UE via DL and a second UE via UL, where the UEs may operate half-duplex. In another example, FD communications can include a third case where one BS and one UE may operate in FD to communicate with one another concurrently via DL and UL. One possible issue with FD communications can include self-interference at the device that supports FD communication, where a transmitted signal may leak into a receive antenna port and/or where a transmitted signal may be reflected by an object (or clutter) back into the receive antenna port (referred to as clutter echo). Reducing self-interference (SI) (especially for clutter echo, which may occur sporadically) can be mitigated by spatial isolation between the transmitted signal and the receive antenna port. Spatial isolation may be achieved by choosing transmit and receive beam pairs that do not result in self-interference. For example, the transmit and receive beams can be achieved by beamforming antenna resources (e.g., selectively applying power to antenna resources) to achieve a directionality for transmitting or receiving signals.

To determine whether a device can support FD capability or to enable/enhance FD communications, the device can perform self-interference measurement based on candidate beam pairs. For example, while the device is sending a signal from a first set of antennas (on one or more transmit beam directions), the device can measure the received signal (e.g., as reflected or leaked transmit signal) on a second set of antennas (on one or more receive beam directions). In some examples, the first and second set of antennas may be the same or may include at least some of the same antennas. Where the measured received signal is below a threshold signal power or quality, for example, the device can support and/or enable FD communications. In FD operation, e.g. the first case or third case above where the UE is in FD communications, the originally identified DL/UL beam pair(s) at the device may have degraded performance or even failure due to stronger leaked self-interference, e.g. due to device mobility, device rotation, moving objects or reflectors that cause clutter echo, etc. In an example, the base station (e.g., gNB) or an FD operation manager can identify the degraded/failed current FD beam pair(s) at the device in time. For example, an FD operation manager can be a function or node of a wireless network, accessible via a base station, that can perform the functionality described herein related to determining beam pairs for a UE and/or base station to use in communicating in the wireless network. As replacement, new candidate FD beam pair(s) can be identified before or after the detection of the degraded performance for the current FD beam pair(s).

In aspects described herein, a device in FD communications can determine or receive a configuration for autonomously measuring new candidate beams and can measure and report new candidate beam pairs to a base station. For example, the device can measure new candidate beam pairs during scheduled uplink transmission or can request measurement gap configuration to identify measurement gaps during which the UE can transmit signaling and measure the received signal. The device can report the measurements and/or an identification of the new candidate beam pair based on one or more reporting criteria. The base station can, based on the report, configure one or more new candidate beam pairs for the device to use in subsequent communications. In addition, the device may configure (e.g., based on a received signaling from the base station or based on detecting the one or more new candidate beam pairs) the one or more new candidate beam pairs for subsequent communications with the base station. This can allow for modification of the beam pair used for FD communications to avoid self-interference at a device, which may be caused when the device moves or rotates, when clutter becomes present, etc.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for measuring and reporting candidate beam pairs, in accordance with aspects described herein. In addition, some nodes may have a modem 340 and configuring component 342 for configuring a device to measure and report candidate beam pairs, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can autonomously measure and report new candidate beam pairs for use in communicating in full duplex. For example, autonomously measuring and/or reporting can refer to performing the measuring and/or reporting without being instructed (e.g., by a base station or other node) to measure and/or report beam pairs, e.g., at least not being instructed or requested to do so at a given time window or instance. Rather, in some examples, the communicating component 242 can determine when to measure and/or report beam pairs, though in some examples the time period for measuring and/or reporting can be determined from a configuration for, or scheduling of, multiple time periods. For example, communicating component 242 can measure the new candidate beam pairs based on transmitting UL signals in scheduled resources or configured measurement gaps based on a transmit beam of a candidate beam pair, and measuring received signal energy based on a receive beam of the candidate beam pair. In one example, configuring component 342 can configure the UE 104 with measurement gaps for measuring the new candidate beams. In an example, the UE 104 can transmit measurement results for the new candidate beam pairs and/or current beam pairs to the base station 102, and configuring component 342 may or may not configure the UE 104 to use the new candidate beam pair based on the measurement results.

Figure 2:
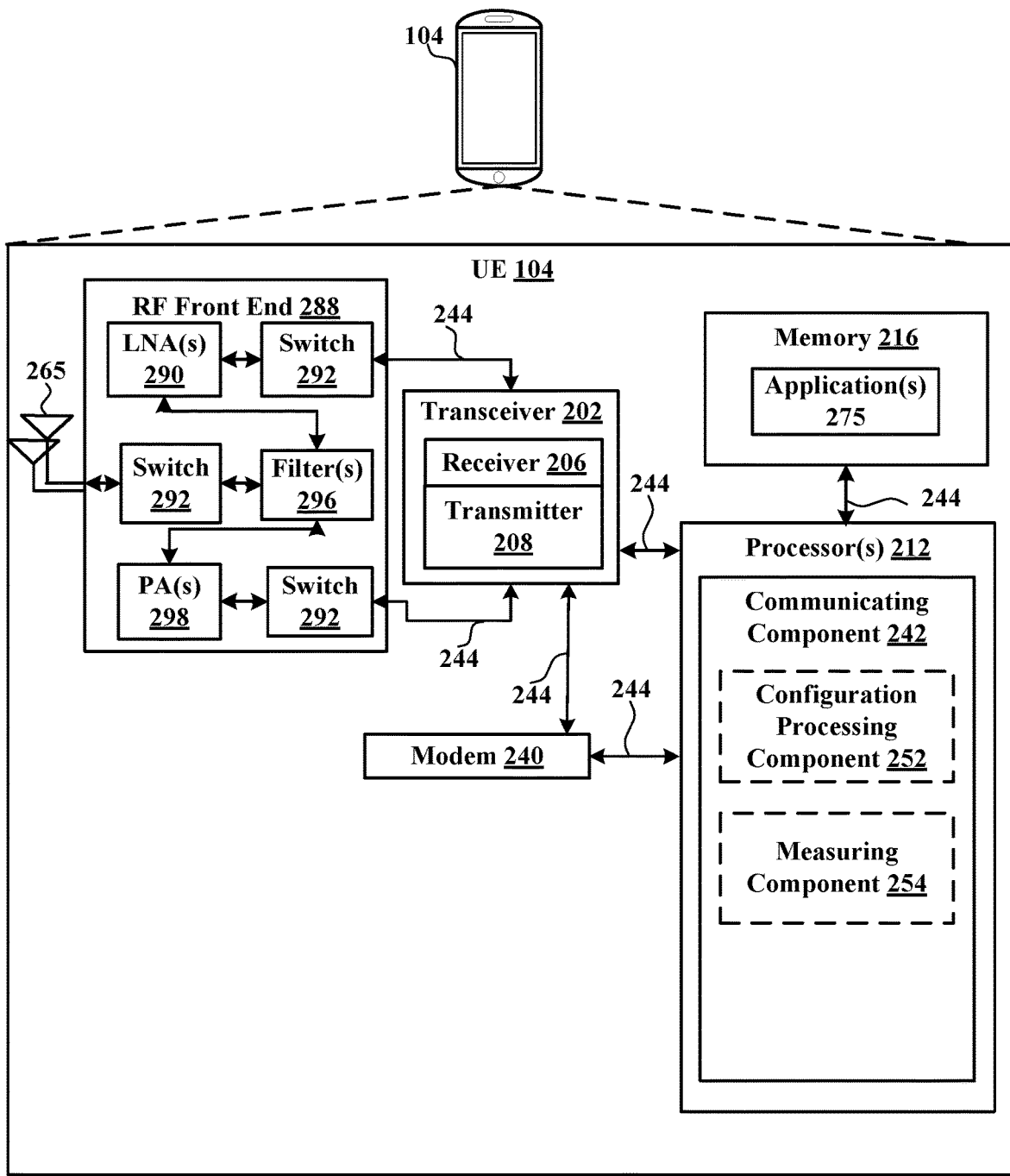
FIG. 2 is a block diagram illustrating an example of a UE, in accordance with various aspects of the present disclosure.
Figure 3:
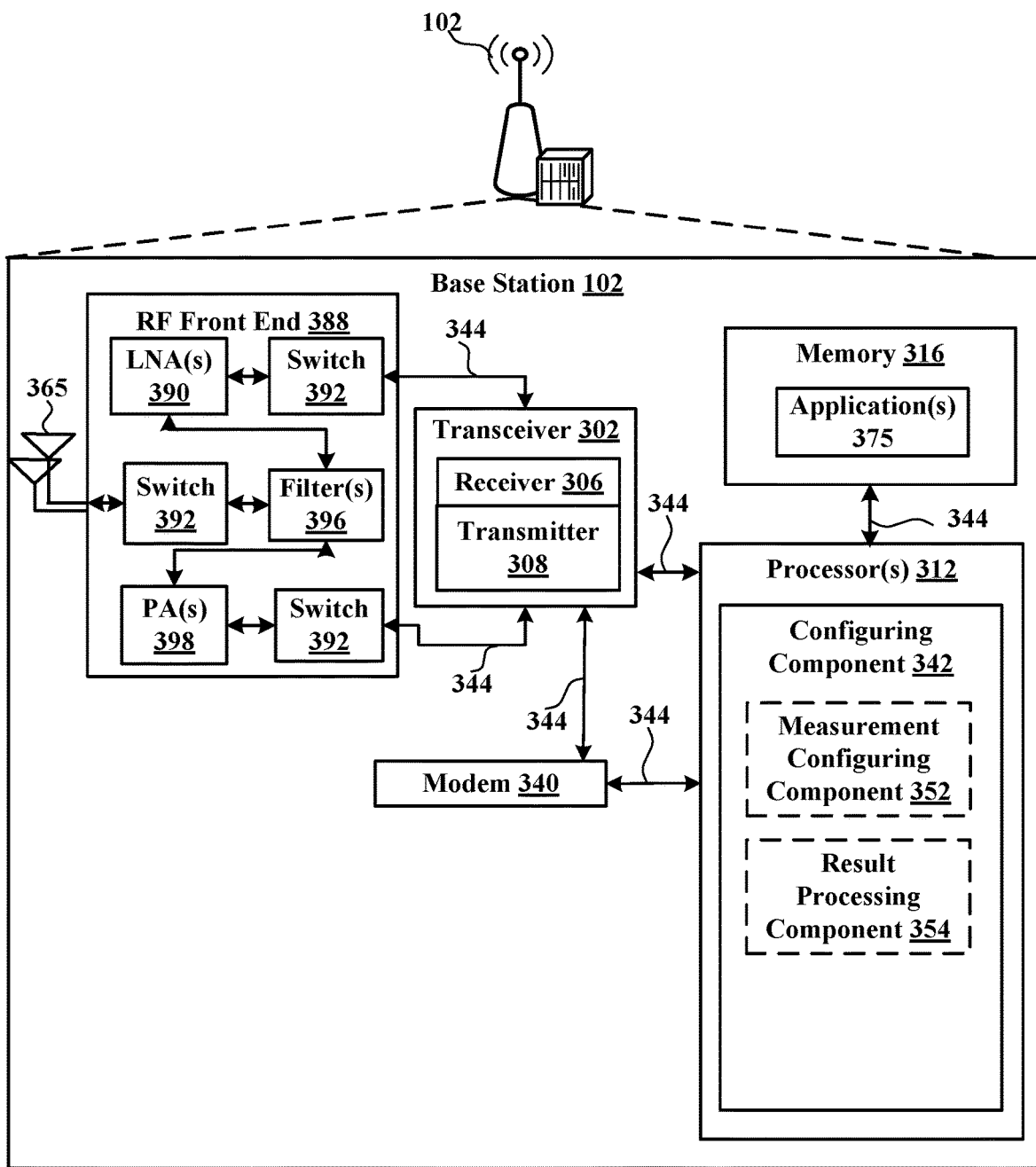
FIG. 3 is a block diagram illustrating an example of a base station, in accordance with various aspects of the present disclosure.
Figure 4:
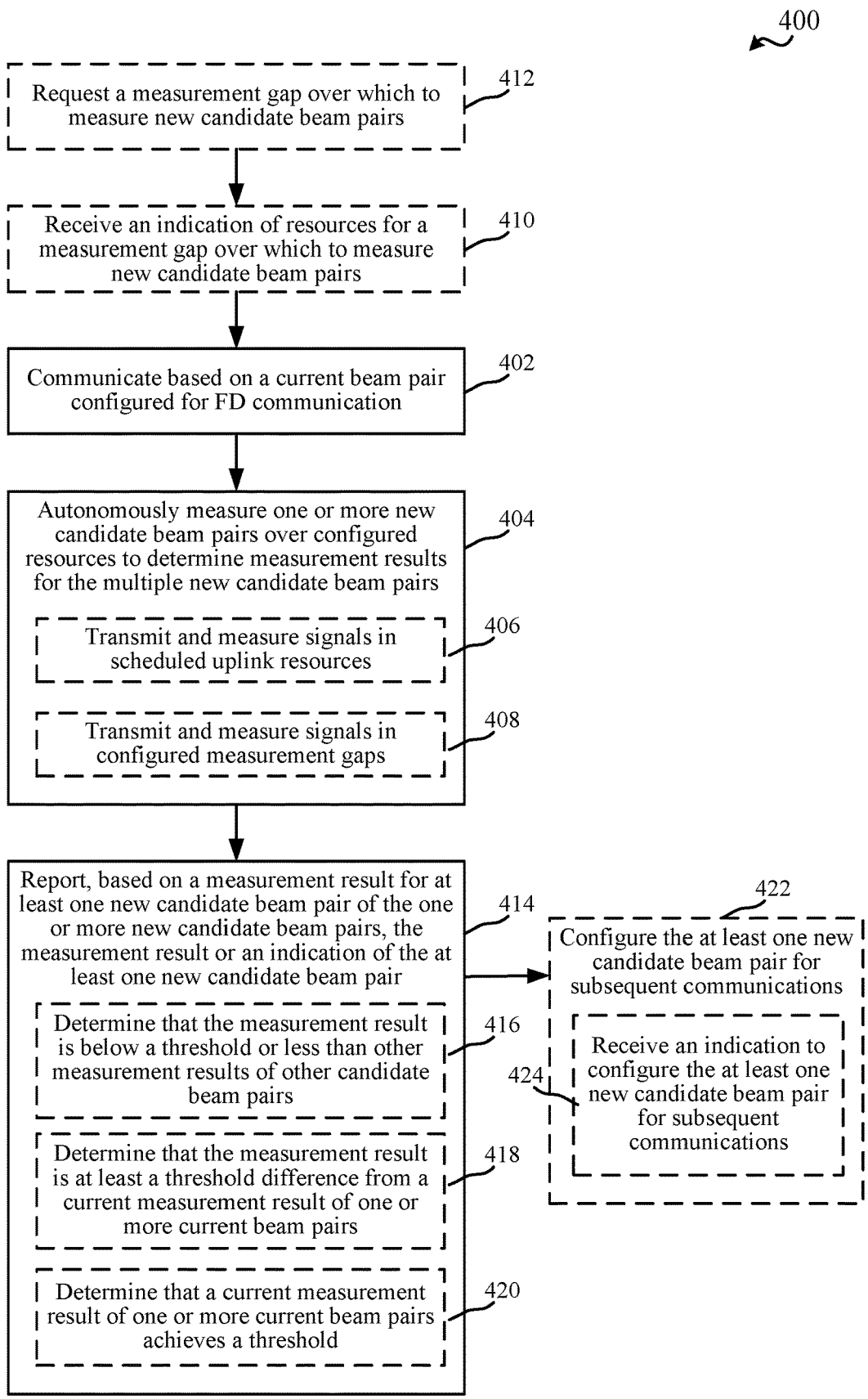
FIG. 4 is a flow chart illustrating an example of a method for measuring and/or reporting new candidate beam pairs, in accordance with various aspects of the present disclosure.
Figure 5:
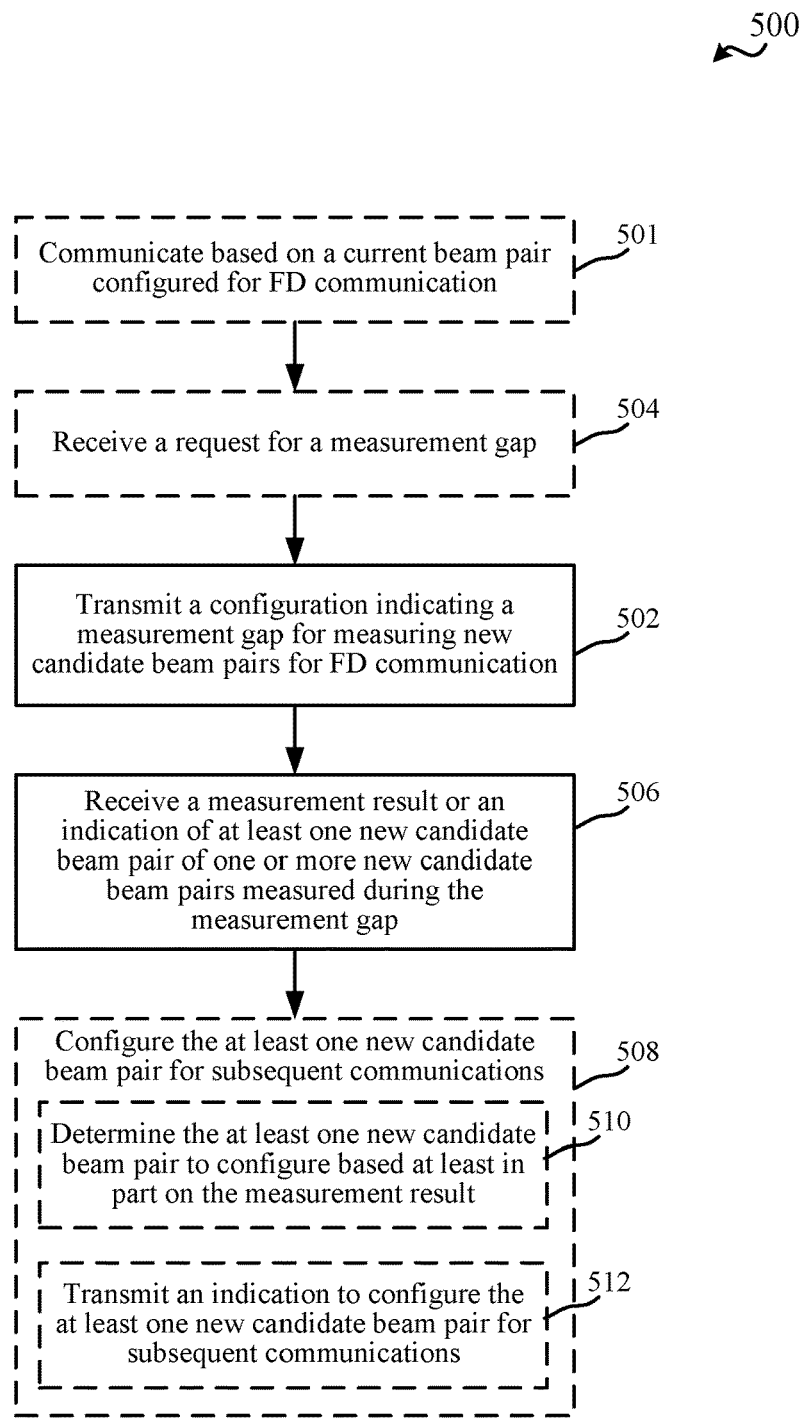
FIG. 5 is a flow chart illustrating an example of a method for configuring a device for measuring and/or reporting new candidate beam pairs, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for measuring and reporting candidate beam pairs, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a configuration processing component 252 for processing a configuration for measuring new candidate beam pairs for FD communications, and/or a measuring component 254 for autonomously measuring one or more new candidate beam pairs and/or reporting a measurement result of the one or more new candidate beam pairs, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device to measure and report candidate beam pairs, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a measurement configuring component 352 for configuring a UE to measure new candidate beam pairs for FD communications, and/or a result processing component 354 for processing one or more measurement results received from a UE for new candidate beam pairs, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for measuring new candidate beam pairs, in accordance with aspects described herein. In an example, a UE 104 can perform the functions described in method 400 using one or more of the components described in FIGS. 1 and 2.

In method 400, at Block 402, communication can occur based on a current beam pair configured for FD communication. In an aspect, communicating component 242, e.g., in conjunction with processor(s) 212, memory 216, transceiver 202, etc., can communicate based on a current beam pair configured for FD communication. For example, communicating component 242 can determine the current beam pair based on an initial configuration from a base station 102, a beam training procedure performed with the base station 102 to determine, based on measuring signals related to multiple beam pairs, a desirable beam pair not exhibiting over a threshold level of self-interference, etc. As described, the current beam pair may become undesirable or may exhibit over a threshold level of self-interference due to UE mobility or rotation, movement of clutter objects to reflect signals transmitted by the UE 104, etc. Accordingly, as described herein, the UE 104 can autonomously measure beam pairs (e.g., periodically or based on an event, such as determining that the current beam pair is degrading, etc.) to determine new candidate beam pairs for possibly configuring for subsequent communications.

In method 400, at Block 404, one or more new candidate beam pairs can be autonomously measured over configured resources to determine measurement results for the multiple new candidate beam pairs. In an aspect, measuring component 254, e.g., in conjunction with processor(s) 212, memory 216, transceiver 202, communicating component 242, etc., can autonomously measure the one or more new candidate beam pairs, which may include multiple new candidate beam pairs, over the resources to determine measurement results for the multiple new candidate beam pairs.

For example, measuring component 254 can autonomously measure the one or more new candidate beam pairs by transmitting UL signals over scheduled resources or during configured measurement gaps and based on a transmit beam of a new candidate beam pair, while receiving and measuring the signal based on a receive beam of the new candidate beam pair.

In one example, in autonomously measuring the one or more new candidate beam pairs at Block 404, optionally at Block 406, signals can be transmitted and measured in scheduled uplink resources. In an aspect, communicating component 242, e.g., in conjunction with processor(s) 212, memory 216, transceiver 202, etc., can transmit, and measuring component 254 can measure, signals in scheduled uplink resources. For example, communicating component 242 can transmit the scheduled uplink communication (e.g., over scheduled uplink control channel (e.g., physical uplink control channel (PUCCH)) or uplink data channel (e.g., physical uplink shared channel (PUSCH)) resources), a UL reference signal, such as a sounding reference signal (SRS), a random access procedure message, etc. during corresponding scheduled resources. In this example, measuring component 254 can measure the transmitted uplink communication as received based on a receive beam of the new candidate beam pair at the UE 104. In this example, measuring component 254 can measure transmitted communications transmitted based on one or more transmit beams of the multiple new candidate beam pairs, and can measure the transmitted communications based on one or more receive beams of the multiple new candidate beam pairs, and can determine measurement results for each of the multiple new candidate beam pairs. For example, communicating component 242 can transmit the uplink communication by applying a beamforming using antenna resources of the UE 104 to form a spatial direction of the transmit beam, and can receive the uplink communications by applying a beamforming using antenna resources of the UE 104 to form a spatial direction of the receive beam. The measurement result determined based on receiving the signal via the receive beam can include an indication of a level of self-interference, which may be in the form of a RSRP, RSSI, reference signal received quality (RSRQ), SNR, signal-to-interference-and-noise ratio (SINR), etc. of the received signal. In an example, a high value for the power can indicate a high level of self-interference. In an example, the UE 104 can measure the scheduled UL Tx by different UE Rx beams, and identify Rx beams with sufficiently small self-interference leaked from the Tx beam for the scheduled UL Tx.

In another example, in autonomously measuring the one or more new candidate beam pairs at Block 404, optionally at Block 408, signals can be transmitted and measured in configured measurement gaps. In an aspect, communicating component 242, e.g., in conjunction with processor(s) 212, memory 216, transceiver 202, etc., can transmit, and measuring component 254 can measure, signals in configured measurement gaps. For example, communicating component 242 can transmit a reference signal (e.g., SRS, demodulation reference signal (DMRS), etc.) or other communication (e.g., random access procedure message) in a configured measurement gap. In this example, measuring component 254 can measure the transmitted uplink communication as received based on a receive beam of the new candidate beam pair at the UE 104. In this example, measuring component 254 can measure transmitted communications transmitted based on one or more transmit beams of the multiple new candidate beam pairs, and can measure the transmitted communications based on one or more receive beams of the multiple new candidate beam pairs, and can determine measurement results for each of the multiple new candidate beam pairs. The measurement result can include an indication of a level of self-interference, which may be in the form of a RSRP, RSRQ, RSSI, SNR, SINR, etc., as described above.

In an example, the measurement gap can be configured by the base station 102 or otherwise known by the UE 104 (e.g., stored in memory 216). For example, in method 400, optionally at Block 410, an indication of resources for a measurement gap over which to measurement new candidate beam pairs can be received. In an aspect, configuration processing component 252, e.g., in conjunction with processor(s) 212, memory 216, transceiver 202, communicating component 242, etc., can receive (e.g., from the base station 102) the indication of resources for the measurement gap over which to measure new candidate beam pairs. For example, configuration processing component 252 may receive the indication in a configuration from the base station 102, which may be received in higher layer signaling (e.g., radio resource control (RRC) signaling, system information, other broadcast signaling, etc.), downlink control information (DCI), etc. The indication may indicate resources for the measurement gap, such as periodic time resources during which the UE 104 can measure signals based on the beam pairs. In an example, the measurement gap can be periodically configured by the base station 102 or on-demand requested by the UE 104, and accordingly, configuration processing component 252 may receive the indication of the measurement gap once or periodically, or based on an on-demand request for the measurement gap.

In one example, in method 400, optionally at Block 412, a measurement gap over which to measure new candidate beam pairs can be requested. In an aspect, configuration processing component 252, e.g., in conjunction with processor(s) 212, memory 216, transceiver 202, communicating component 242, etc., can request the measurement gap over which to measurement new candidate beam pairs. In one example, configuration processing component 252 can request the measurement gap in uplink control information (UCI) or other request transmitted to the base station 102. Moreover, in an example, configuration processing component 252 can request the measurement gap based on also measuring a candidate beam pair (e.g., over scheduled uplink resources) and determining that the candidate beam pair exhibits a threshold level of self-interference or otherwise degrades below the threshold level, degrades at least at a threshold certain rate over a window or period of time, etc.

In method 400, at Block 414, based on a measurement result for at least one new candidate beam pair of the one or more new candidate beam pairs, the measurement result or an indication of the at least one new candidate beam pair can be reported. In an aspect, measuring component 254, e.g., in conjunction with processor(s) 212, memory 216, transceiver 202, communicating component 242, etc., can report, based on the measurement result for at least one new candidate beam pair of the one or more new candidate beam pairs, the measurement result or an indication of the at least one new candidate beam pair. For example, measuring component 254 can send the measurement result or the indication of the at least one beam pair to the base station 102. In one example, where the UE 104 communicates in FD with different TRPs of the base station 102, measuring component 254 can report the measurement result or the indication of the at least one beam pair to one or more of the different TRPs (e.g., and/or one TRP can indicate a beam to the other TRP to use in subsequent communications with the UE 104).

In an example, measuring component 254 can report the measurement result or the indication of the at least one beam pair in resources indicated by the base station 102 (e.g., in the configuration) for reporting. In other examples, measuring component 254 can report the measurement result or the indication of the at least one beam pair in uplink control information (UCI) over an uplink control channel (e.g., physical uplink control channel (PUCCH)), uplink data channel (e.g., physical uplink shared channel (PUSCH)), etc. For example, the PUCCH or PUSCH can be configured or dynamically allocated based on a scheduling request (SR) transmitted by the UE 104 to the base station 102 (e.g., the SR can be sent over PUCCH or in a random access procedure, such as a contention-free random access (CFRA) or contention-based random access (CBRA) procedure), etc.

In one example, in reporting the measurement result or indication at Block 414, optionally at Block 416, it can be determined that the measurement result is below a threshold or less than other measurement results of other candidate beam pairs. In an aspect, measuring component 254, e.g., in conjunction with processor(s) 212, memory 216, transceiver 202, communicating component 242, etc., can determine that the measurement result is below the threshold or less than other measurement results of other candidate beam pairs, and can report the measurement result or indication based on this determination. For example, the UE 104 can send the report when new FD beam pair(s) are identified with leaked interference less than a threshold, which can be configured by gNB or otherwise indicated in the UE 104 (e.g., in memory 216).

In another example, in reporting the measurement result or indication at Block 414, optionally at Block 418, it can be determined that the measurement result is at least a threshold difference from a current measurement result of one or more current beam pairs. In an aspect, measuring component 254, e.g., in conjunction with processor(s) 212, memory 216, transceiver 202, communicating component 242, etc., can determine that the measurement result is at least a threshold difference from a current measurement result of one or more current beam pairs. For example, measuring component 254 can also measure current beam pairs in transmitting uplink signals, as described above (e.g., in scheduled uplink resources or measurement gaps) and can detect occurrence of an event where the measurement result for the at least one new candidate beam pair is at least the threshold difference (e.g., better, or of less signal power/energy) than a current measurement result of a current beam pair. For example, the UE 104 can send the report when new FD beam pair(s) are identified with leaked interference less than that for any current FD beam pair (or where a difference between the new FD beam pair(s) and current FD beam pair is at least at a threshold level).

In yet another example, in reporting the measurement result or indication at Block 414, optionally at Block 420, it can be determined that a current measurement result of one or more current beam pairs achieves a threshold. In an aspect, measuring component 254, e.g., in conjunction with processor(s) 212, memory 216, transceiver 202, communicating component 242, etc., can determine that the current measurement result of the one or more current beam pairs achieves the threshold, and measuring component 254 can report the measurement result or indication of the at least one new candidate beam pair based on this determination, such to possibly configure the at least one new candidate beam pair instead of the current beam pair.

In any case, in reporting the measurement result or indication, measuring component 254 can send the report in MAC-CE or UCI. For example, the MAC-CE carrying the report can be sent in any PUSCH, which can be configured or dynamic grant. If there is no known UL grant when the report is generated, UE may send SR via PUCCH or RACH to solicit a new UL grant, as described above. In another example, the UCI carrying the report can be sent in PUCCH or PUSCH. In an example, in reporting the measurement result or indication, measuring component 254 can multiplex the report with other uplink control information, such as acknowledgement/negative-acknowledgement (A/N) feedback, channel state information (CSI) report, etc. in the UCI. In one example, the base station 102 (e.g., gNB) can determine the presence of the report in the UCI via different hypothesis for the UCI payload size.

In method 400, optionally at Block 422, the at least one new candidate beam pair can be configured for subsequent communications. In an aspect, communicating component 242, e.g., in conjunction with processor(s) 212, memory 216, transceiver 202, etc., can configure the at least one new candidate beam pair for subsequent communications. In one example, communicating component 242 can configure the at least one new candidate beam pair based on determining to report the at least one new candidate beam pair to the base station 102, which can be based on one or more other determinations described above (e.g., determining that the at least one new candidate beam pair has a measurement result that indicates an acceptable level of self-interference (e.g., the signal quality achieves a threshold), determining that the at least one new candidate beam pair has a measurement result that is at least a threshold difference from the current measurement result of one or more current beam pairs, determining that the current measurement result of one or more current beam pairs achieves a threshold level of self-interference, etc.).

In another example, in configuring the at least one new candidate beam pair at Block 422, optionally at Block 424, an indication to configure the at least one new candidate beam pair for subsequent communications can be received. In an aspect, communicating component 242, e.g., in conjunction with processor(s) 212, memory 216, transceiver 202, etc., can receive (e.g., from the base station 102) the indication to configure the at least one new candidate beam pair for subsequent communications. For example, base station 102 can determine to configure the new beam pair, as described further herein, based on the various received measurement results, and can transmit the indication to the UE 104 to configure the new beam pair. Communicating component 242 can accordingly receive the indication and configure the new beam pair (e.g., instead of the current beam pair(s) or in addition to the current beam pair(s)) for subsequent FD communications.

FIG. 5 illustrates a flow chart of an example of a method 500 for configuring a device for measuring new candidate beam pairs, in accordance with aspects described herein. In an example, a base station can perform the functions described in method 500 using one or more of the components described in FIGS. 1 and 3.

In method 500, optionally at Block 501, communications can occur based on a current beam pair configured for FD operation. In an aspect, configuring component 342, e.g., in conjunction with processor(s) 312, memory 316, transceiver 302, etc., can communicate based on the current beam pair configured for FD operation. For example, the base station 102 can communicate with the UE 104 using one or more current beam pairs that may have initially been determined as having desirable signal metrics or otherwise not exhibit self-interference. The base station 102 can configure the UE 104 with the one or more current beams as an initial configuration based on reported measurements, using one or more techniques described herein (e.g., for reporting and/or configuring a new candidate beam pair from a previous beam pair, etc.), during beam training, etc.

In method 500, at Block 502, a configuration indicating a measurement gap for measuring multiple new candidate beam pairs for FD communications can be transmitted. In an aspect, measurement configuring component 352, e.g., in conjunction with processor(s) 312, memory 316, transceiver 302, configuring component 342, etc., can generate and transmit the configuration indicating the measurement gap for measuring the multiple new candidate beam pairs for FD commutation. For example, measurement configuring component 352 can generate the configuration to indicate at least resources over which a UE 104 can measure multiple new candidate beam pairs, by transmitting uplink signals (e.g., UL reference signals) based on a transmit beam and measuring signal energy based on a receive beam, as described. In addition, in an example, the configuration or a separate configuration from the base station 102 may indicate one or more thresholds for determining when to report measurement results or indications of new candidate beams to the base station 102. For example, the one or more thresholds may include a threshold self-interference for new beam pairs, a threshold self-interference for current beam pairs, a threshold difference in self-interference between new and current beam pairs, etc. In an example, measurement configuring component 352 can configure the UE 104 with periodic measurement gaps for performing such measurements. In another example, measurement configuring component 352 can configure the UE 104 on demand.

In method 500, optionally at Block 504, a request for a measurement gap can be received. In an aspect, measurement configuring component 352, e.g., in conjunction with processor(s) 312, memory 316, transceiver 302, configuring component 342, etc., can receive the request for the measurement gap from the UE 104. For example, measurement configuring component 352 can receive the request where the UE 104 detects a current measurement result of a current beam pair achieving a threshold self-interference level, as described. In an example, measurement configuring component 352 can receive the request in UCI or other signaling from the UE 104, and/or can transmit the configuration (e.g., at Block 502) based on receiving the request.

In method 500, at Block 506, a measurement result or an indication of at least one new candidate beam pair of one or more new candidate beam pairs measured during the measurement gap can be received. In an aspect, result processing component 354, e.g., in conjunction with processor(s) 312, memory 316, transceiver 302, configuring component 342, etc., can receive (e.g., from the UE and/or based on transmitting the configuration), the measurement result or the indication of the at least one new candidate beam pair of the one or more new candidate beam pairs, which may include multiple new candidate beam pairs, measured during the measurement gap. As described, the UE 104 can measure new candidate beam pairs over resources indicated as the measurement gap, and can provide associated measurement results or a selection of a new candidate beam pair to the base station 102.

In method 500, optionally at Block 508, the at least one new candidate beam pair can be configured for subsequent communications. In an aspect, result processing component 354, e.g., in conjunction with processor(s) 312, memory 316, transceiver 302, configuring component 342, etc., can determine to configure the at least one new candidate beam pair for subsequent communications. For example, result processing component 354 can configure the new candidate beam pair (e.g., for the base station 102 and/or the UE 104) based on a received indication of the new candidate beam pair, based on analyzing or comparing the measurement results of one or more new candidate beam pairs and/or a current measurement result of one or more current beam pairs, etc.

For example, in configuring the at least one new candidate beam pair at Block 508, optionally at Block 510, the at least one new candidate beam pair can be determined to configure based at least in part on the measurement result. In an aspect, result processing component 354, e.g., in conjunction with processor(s) 312, memory 316, transceiver 302, configuring component 342, etc., can determine the at least one new candidate beam pair to configure based at least in part on the measurement result. For example, result processing component 354 can determine that the at least one new candidate beam pair has a measurement result that is below a self-interference threshold or is better than a current measurement result of a current beam pair by at least a threshold, can determine the current measurement result achieves a threshold self-interference level, etc. For example, result processing component 354 can compare the measurement results, as described, to determine whether to configure a new candidate beam pair and/or whether to keep using a current beam pair. In another example, the indication received from the UE (e.g., at Block 506) can indicate the new candidate beam to configure. In any case, in one example, where the new candidate beam pair is to be configured, configuring component 342 can transmit, to the UE 104, an indication to configure the new candidate beam pair and/or can configure the new candidate beam pair for use at the base station 102 as well.

For example, in configuring the at least one new candidate beam pair at Block 508, optionally at Block 512, an indication to configure the at least one new candidate beam pair for subsequent communications can be transmitted. In an aspect, configuring component 342, e.g., in conjunction with processor(s) 312, memory 316, transceiver 302, etc., can transmit an indication to configure the at least one new candidate beam pair for subsequent communications. For example, configuring component 342 can transmit the indication to the UE 104 to allow the UE 104 to switch to the new candidate beam pair. In other examples, however, the UE 104 can switch to the new candidate beam pair based on evaluating its measurement results, as described above. In yet another example, configuring component 342 can transmit the indication to a TRP of the base station 102. For example, where the base station 102 uses a first TRP for downlink transmission and a second TRP for uplink reception, one TRP can receive the report from the UE 104, and the base station 102 can configure the new candidate beam pair (or at least a transmit or receive beam of the new candidate beam pair) to one or both of the TRPs.

Figure 6:
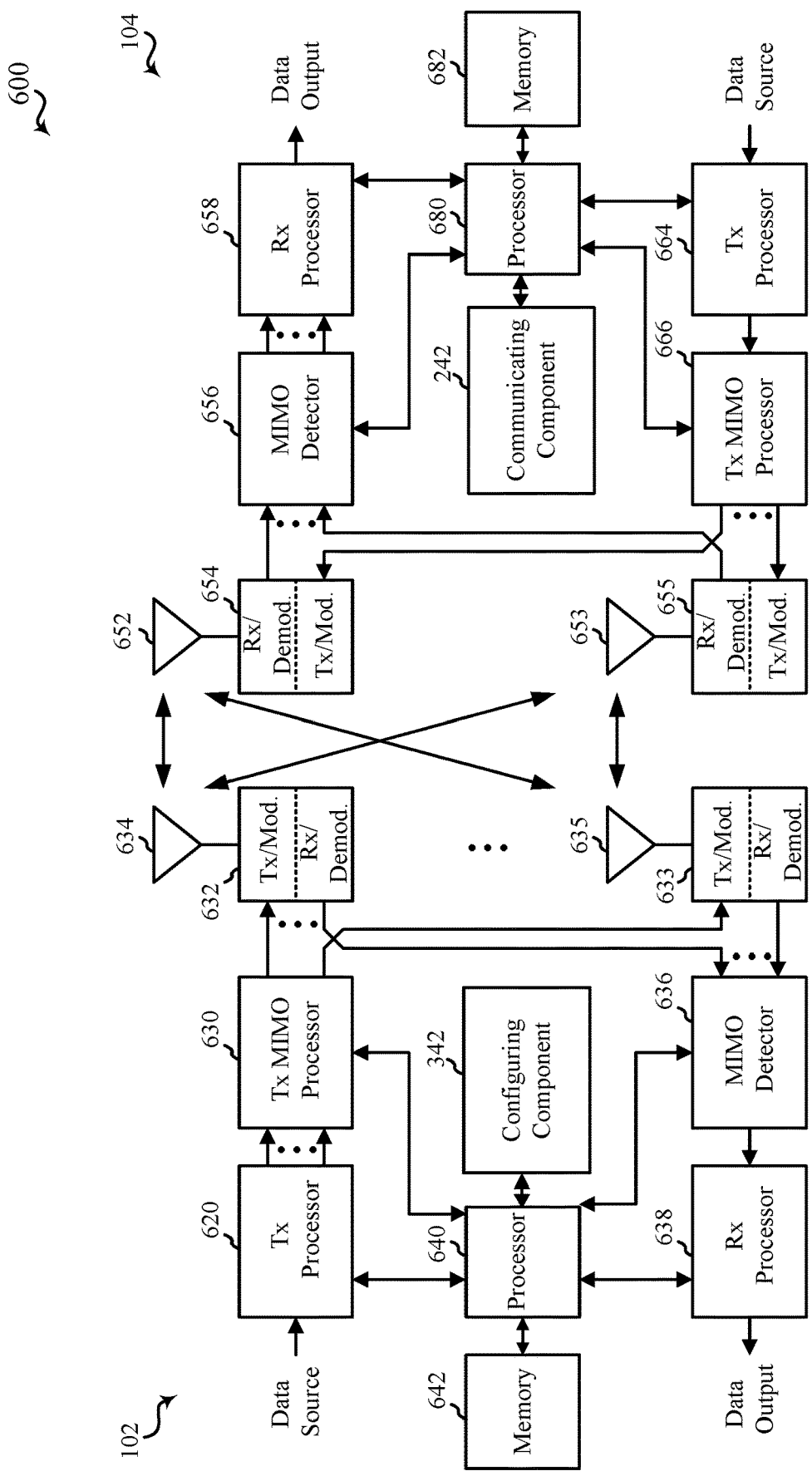
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including communicating based on a current beam pair configured for full-duplex communication, autonomously measuring one or more new candidate beam pairs during configured resources to determine measurement results for the one or more new candidate beam pairs, and reporting, based on a measurement result for at least one new candidate beam pair of the one or more new candidate beam pairs, the measurement result or an indication of the at least one new candidate beam pair.

In Aspect 2, the method of Aspect 1 includes where autonomously measuring the one or more new candidate beam pairs comprises transmitting, over scheduled uplink resources, an uplink communication using a transmit beam of the one or more new candidate beam pairs, measuring, over the scheduled uplink resources, the uplink communication using one or more receive beams of the one or more new candidate beam pairs, and determining the one or more new candidate beam pairs as each including the transmit beam and at least a portion of the one or more receive beams determined to have the measurement result below a threshold.

In Aspect 3, the method of Aspect 2 includes where the uplink communication is at least one of an uplink control channel communications, an uplink data channel communication, a reference signal, or a random access procedure communication.

In Aspect 4, the method of any of Aspects 1 to 3 includes receiving an indication of resources for a measurement gap, where autonomously measuring the one or more new candidate beam pairs comprises transmitting, over the resources of the measurement gap, an uplink reference signal using a transmit beam of the one or more new candidate beam pairs, measuring, over the resources of the measurement gap, the uplink reference signal using one or more receive beams of the one or more new candidate beam pairs, and determining the one or more new candidate beam pairs as each including the transmit beam and at least a portion of the one or more receive beams determined to have the measurement result below a threshold.

In Aspect 5, the method of Aspect 4 includes where the uplink reference signal is at least one of a sounding reference signal, a demodulation reference signal, or a random access procedure communication.

In Aspect 6, the method of any of Aspects 4 or 5 includes where receiving the indication of resources for the measurement gap comprises receiving at least one of a periodic configuration or an on-demand configuration based on a transmitted request.

In Aspect 7, the method of Aspect 6 includes requesting the on-demand configuration based at least in part on determining that a downlink reception quality is below a threshold.

In Aspect 8, the method of any of Aspects 4 to 7 includes where transmitting the uplink reference signal comprises transmitting the uplink reference signal using multiple transmit beams, where measuring the uplink reference signal comprises measuring the uplink reference signal transmitted using the multiple transmit beams using the one or more receive beams, and where determining the one or more new candidate beam pairs comprises determining the one or more new candidate beam pairs as each including one of the multiple transmit beams and at least the portion of the one or more receive beams determined to have the measurement result below the threshold.

In Aspect 9, the method of any of Aspects 1 to 8 includes where reporting the measurement result or the indication of the at least one new candidate beam pair is based at least in part on determining that the at least one new candidate beam pair has the measurement result that is below a threshold.

In Aspect 10, the method of Aspect 9 includes where reporting the measurement result or the indication of the at least one new candidate beam pair is further based at least in part on determining that a current measurement result of one or more current beams is above a threshold.

In Aspect 11, the method of any of Aspects 1 to 10 includes where reporting the measurement result or the indication of the at least one new candidate beam pair is based at least in part on determining that the at least one new candidate beam pair has the measurement result that is less than other ones of the one or more new candidate beam pairs or less than that of a current beam pair.

In Aspect 12, the method of Aspect 11 includes where reporting the measurement result or the indication of the at least one new candidate beam pair is further based at least in part on determining that a current measurement result of one or more current beams is above a threshold.

In Aspect 13, the method of any of Aspects 1 to 12 includes where reporting the measurement result or the indication of the at least one new candidate beam pair is sent via media access control (MAC) control element (CE).

In Aspect 14, the method of any of Aspects 1 to 13 includes where reporting the measurement result or the indication of the at least one new candidate beam pair is sent in uplink control information (UCI) over uplink channel resources.

In Aspect 15, the method of Aspect 14 includes multiplexing the measurement result or the indication of the at least one new candidate beam pair with other UCI.

In Aspect 16, the method of any of Aspects 1 to 15 includes receiving an indication to use the at least one new candidate beam pair in subsequent communications.

Aspect 17 is a method for wireless communication including transmitting a configuration indicating a measurement gap for measuring new candidate beam pairs for full-duplex communication, and receiving a measurement result or an indication of at least one new candidate beam pair of one or more new candidate beams measured during the measurement gap.

In Aspect 18, the method of Aspect 17 includes where transmitting the configuration is based on receiving a request for the measurement gap.

In Aspect 19, the method of any of Aspects 17 or 18 includes where the configuration indicates one or more parameters for transmitting the measurement result.

In Aspect 20, the method of Aspect 19 includes where the one or more parameters relate to determining that the measurement result is above or below a threshold.

In Aspect 21, the method of any of Aspects 17 to 20 includes where receiving the measurement result or the indication of the at least one new candidate beam pair is via media access control (MAC) control element (CE).

In Aspect 22, the method of any of Aspects 17 to 21 includes where receiving the measurement result or the indication of the at least one new candidate beam pair is in uplink control information (UCI) over uplink channel resources.

In Aspect 23, the method of Aspect 22 includes where the measurement result or the indication of the at least one new candidate beam pair is multiplexed with other UCI, and further comprising determining existence of the measurement result or the indication of the at least one new candidate beam pair based on a hypothesis for UCI size.

In Aspect 24, the method of any of Aspects 17 to 23 includes configuring the at least one new candidate beam pair in subsequent communications.

Aspect 25 is an apparatus for wireless communication including a transceiver, a memory configured to store instructions, and one or more processors communicatively coupled with the memory and the transceiver, where the one or more processors are configured to perform one or more of the methods of any of Aspects 1 to 24.

Aspect 26 is an apparatus for wireless communication including means for performing one or more of the methods of any of Aspects 1 to 24.

Aspect 27 is a computer-readable medium including code executable by one or more processors for wireless communications, the code including code for performing one or more of the methods of any of Aspects 1 to 24.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to execute the instructions to cause the apparatus to:
   communicate based on a current full-duplex (FD) beam pair configured for full-duplex communication, wherein the current FD beam pair includes both of a transmit beam for transmitting communications by the apparatus and a receive beam for receiving communications by the apparatus;
   autonomously measure one or more new candidate FD beam pairs using configured resources to determine measurement results for the one or more new candidate FD beam pairs including, for each given candidate FD beam pair in at least a subset of the one or more new candidate FD beam pairs, measuring self-interference caused in communications received by the apparatus and using one or more receive beams of the given candidate FD beam pair by communications transmitted by the apparatus using one or more transmit beams of the given candidate FD beam pair; and
   report, based on a measurement result for at least one new candidate FD beam pair of the one or more new candidate FD beam pairs, the measurement result or an indication of the at least one new candidate FD beam pair.

2. The apparatus of claim 1, wherein the one or more processors are configured to execute the instructions to cause the apparatus to autonomously measure the one or more new candidate FD beam pairs at least in part by:
   transmitting, over scheduled uplink resources, an uplink communication using a transmit beam of the one or more new candidate FD beam pairs;
   measuring, over the scheduled uplink resources, the uplink communication using one or more receive beams of the one or more new candidate FD beam pairs; and
   determining the at least one new candidate FD beam pair from the one or more new candidate FD beam pairs as each including a corresponding transmit beam and at least a portion of one or more corresponding receive beams determined to have the measurement result below a threshold.

3. The apparatus of claim 2, wherein the uplink communication is at least one of an uplink control channel communications, an uplink data channel communication, a reference signal, or a random access procedure communication.

4. The apparatus of claim 1, wherein the one or more processors are further configured to execute the instructions to cause the apparatus to receive an indication of resources for a measurement gap, and wherein the one or more processors are configured to execute the instructions to cause the apparatus to autonomously measure the one or more new candidate FD beam pairs at least in part by:
   transmitting, over the resources of the measurement gap, an uplink reference signal using a transmit beam of the one or more new candidate FD beam pairs;
   measuring, over the resources of the measurement gap, the uplink reference signal using one or more receive beams of the one or more new candidate FD beam pairs; and
   determining the at least one new candidate FD beam pair from the one or more new candidate FD beam pairs as each including a corresponding transmit beam and at least a portion of one or more corresponding receive beams determined to have the measurement result below a threshold.

5. The apparatus of claim 4, wherein the uplink reference signal is at least one of a sounding reference signal, a demodulation reference signal, or a random access procedure communication.

6. The apparatus of claim 4, wherein the one or more processors are configured to execute the instructions to cause the apparatus to receive the indication of resources for the measurement gap as at least one of a periodic configuration or an on-demand configuration based on a transmitted request.

7. The apparatus of claim 6, wherein the one or more processors are further configured to execute the instructions to cause the apparatus to request the on-demand configuration based at least in part on determining that a downlink reception quality is below a threshold.

8. The apparatus of claim 4, wherein the one or more processors are configured to execute the instructions to cause the apparatus to transmit the uplink reference signal using multiple transmit beams, wherein the one or more processors are configured to execute the instructions to cause the apparatus to measure the uplink reference signal transmitted using the multiple transmit beams using the one or more receive beams, and wherein the one or more processors are configured to execute the instructions to cause the apparatus to determine the one or more new candidate FD beam pairs as each including one of the multiple transmit beams and at least the portion of the one or more receive beams determined to have the measurement result below the threshold.

9. The apparatus of claim 1, wherein the one or more processors are configured to execute the instructions to cause the apparatus to report the measurement result or the indication of the at least one new candidate FD beam pair based at least in part on determining that the at least one new candidate FD beam pair has the measurement result that is below a threshold.

10. The apparatus of claim 9, wherein the one or more processors are configured to execute the instructions to cause the apparatus to report the measurement result or the indication of the at least one new candidate FD beam pair further based at least in part on determining that a current measurement result of the current FD beam pair is above a threshold.

11. The apparatus of claim 1, wherein the one or more processors are configured to execute the instructions to cause the apparatus to report the measurement result or the indication of the at least one new candidate FD beam pair based at least in part on determining that the at least one new candidate FD beam pair has the measurement result that is less than other ones of the one or more new candidate FD beam pairs or less than that of a current beam pair.

12. The apparatus of claim 11, wherein the one or more processors are configured to execute the instructions to cause the apparatus to report the measurement result or the indication of the at least one new candidate FD beam pair further based at least in part on determining that a current measurement result of one or more current beams is above a threshold.

13. The apparatus of claim 1, wherein the one or more processors are configured to execute the instructions to cause the apparatus to report the measurement result or the indication of the at least one new candidate FD beam pair via media access control (MAC) control element (CE).

14. The apparatus of claim 1, wherein the one or more processors are configured to execute the instructions to cause the apparatus to report the measurement result or the indication of the at least one new candidate FD beam pair in uplink control information (UCI) over uplink channel resources.

15. The apparatus of claim 14, wherein the one or more processors are further configured to execute the instructions to cause the apparatus to multiplex the measurement result or the indication of the at least one new candidate FD beam pair with other UCI.

16. The apparatus of claim 1, wherein the one or more processors are further configured to execute the instructions to cause the apparatus to receive an indication to use the at least one new candidate FD beam pair in subsequent communications.

17. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
transmit, to a user equipment (UE), a configuration indicating a measurement gap, wherein the measurement gap is for measuring self-interference caused in communications received by the UE using one or more receive beams of at least one new candidate full-duplex (FD) beam pair by communications transmitted by the UE using one or more transmit beams of the at least one new candidate FD beam pair; and
receive a measurement result or an indication of at least one new candidate FD beam pair of one or more new candidate FD beams measured during the measurement gap.

18. The apparatus of claim 17, wherein the one or more processors are configured to execute the instructions to cause the apparatus to transmit the configuration based on receiving a request for the measurement gap.

19. The apparatus of claim 17, wherein the configuration indicates one or more parameters for transmitting the measurement result.

20. The apparatus of claim 19, wherein the one or more parameters relate to determining that the measurement result is above or below a threshold.

21. The apparatus of claim 17, wherein the one or more processors are configured to execute the instructions to cause the apparatus to receive the measurement result or the indication of the at least one new candidate FD beam pair via media access control (MAC) control element (CE).

22. The apparatus of claim 17, wherein the one or more processors are configured to execute the instructions to cause the apparatus to receive the measurement result or the indication of the at least one new candidate FD beam pair in uplink control information (UCI) over uplink channel resources.

23. The apparatus of claim 22, wherein the measurement result or the indication of the at least one new candidate FD beam pair is multiplexed with other UCI, and wherein the one or more processors are further configured to execute the instructions to cause the apparatus to determine existence of the measurement result or the indication of the at least one new candidate FD beam pair based on a hypothesis for UCI size.

24. The apparatus of claim 17, wherein the one or more processors are further configured to execute the instructions to cause the apparatus to configured the at least one new candidate FD beam pair in subsequent communications.

25. A method for wireless communication, comprising:
communicating, by a user equipment (UE), based on a current full-duplex (FD) beam pair configured for full-duplex communication, wherein the current FD beam pair includes both of a transmit beam for transmitting communications by the UE and a receive beam for receiving communications by the UE;
autonomously measuring one or more new candidate FD beam pairs during configured resources to determine measurement results for the one or more new candidate FD beam pairs including, for each given candidate FD beam pair in at least a subset of the one or more new candidate FD beam pairs, measuring self-interference caused in communications received by the UE and using one or more receive beams of the given candidate FD beam pair by communications transmitted by the UE using one or more transmit beams of the given candidate FD beam pair; and reporting, based on a measurement result for at least one new candidate FD beam pair of the one or more new candidate FD beam pairs, the measurement result or an indication of the at least one new candidate FD beam pair.

26. The method of claim 25, wherein autonomously measuring the one or more new candidate FD beam pairs includes:

transmitting, over scheduled uplink resources, an uplink communication using a transmit beam of the one or more new candidate FD beam pairs;

measuring, over the scheduled uplink resources, the uplink communication using one or more receive beams of the one or more new candidate FD beam pairs; and determining the at least one new candidate FD beam pair from the one or more new candidate FD beam pairs as each including a corresponding transmit beam and at least a portion of one or more corresponding receive beams determined to have the measurement result below a threshold.

27. The method of claim 26, wherein the uplink communication is at least one of an uplink control channel communications, an uplink data channel communication, a reference signal, or a random access procedure communication.

28. The method of claim 25, further comprising receiving an indication of resources for a measurement gap, and wherein autonomously measuring the one or more new candidate FD beam pairs includes:

transmitting, over the resources of the measurement gap, an uplink reference signal using a transmit beam of the one or more new candidate FD beam pairs;

measuring, over the resources of the measurement gap, the uplink reference signal using one or more receive beams of the one or more new candidate FD beam pairs; and determining the at least one new candidate FD beam pair from the one or more new candidate FD beam pairs as each including a corresponding transmit beam and at least a portion of one or more corresponding receive beams determined to have the measurement result below a threshold.

29. A method for wireless communication, comprising:

transmitting, to a user equipment (UE), a configuration indicating a measurement gap, wherein the measurement gap is for measuring self-interference caused in communications received by the UE using one or more receive beams of at least one new candidate full-duplex (FD) beam pair by communications transmitted by the UE using one or more transmit beams of the at least one new candidate FD beam pair; and receiving a measurement result or an indication of at least one new candidate FD beam pair of one or more new candidate FD beams measured during the measurement gap.

30. The method of claim 29, wherein transmitting the configuration is based on receiving a request for the measurement gap.

* * * * *